US008702031B2

(12) United States Patent
Morris

(10) Patent No.: US 8,702,031 B2
(45) Date of Patent: Apr. 22, 2014

(54) VTOL TWIN FUSELAGE AMPHIBIOUS AIRCRAFT WITH TILT-CENTER WING, ENGINE AND ROTOR

(76) Inventor: Richard David Morris, Parker, CO (US)

( * ) Notice: Subject to any disclaimer, the term of this patent is extended or adjusted under 35 U.S.C. 154(b) by 239 days.

(21) Appl. No.: 13/134,864

(22) Filed: Jun. 20, 2011

(65) Prior Publication Data

US 2012/0318908 A1    Dec. 20, 2012

(51) Int. Cl.
   *B64C 27/22*    (2006.01)
(52) U.S. Cl.
   USPC .................. 244/6; 244/7 R; 244/12.4; 244/56
(58) Field of Classification Search
   USPC ............................. 244/6, 12.4, 12.5, 56, 7 R
   See application file for complete search history.

(56) References Cited

U.S. PATENT DOCUMENTS

| 2,023,334 | A | * | 12/1935 | Marmonier | 244/13 |
| 3,023,981 | A | * | 3/1962 | Reiniger | 244/12.4 |
| 3,026,065 | A | * | 3/1962 | Holland, Jr. | 244/12.4 |
| 3,244,246 | A | * | 4/1966 | Weiland | 180/120 |
| 3,329,376 | A | * | 7/1967 | Sullivan | 244/12.4 |
| 5,758,844 | A | * | 6/1998 | Cummings | 244/7 C |
| 7,118,066 | B2 | * | 10/2006 | Allen | 244/7 B |
| 7,874,514 | B2 | * | 1/2011 | Said | 244/39 |
| 2006/0016931 | A1 | * | 1/2006 | Malvestuto et al. | 244/45 R |
| 2006/0032970 | A1 | * | 2/2006 | Allen | 244/7 B |

* cited by examiner

*Primary Examiner* — Philip J Bonzell

(57) ABSTRACT

VTOL amphibious aircraft comprising two fuselages spaced apart to enable the placement of single center wing and split ailerons, engine and rotor or fan such that they may be rotated from vertical flight to horizontal flight and back while center wing ailerons counter rotor torque. Out board wings remain fixed and the twin fuselages provide buoyant hulls to facilitate water landings. Standard aircraft components are employed such as a vertical tails and horizontal stabilizers.

3 Claims, 3 Drawing Sheets

VTOL TWIN FUSELAGE AMPHIBIOUS AIRCRAFT WITH TILT-CENTER WING, ENGINE AND ROTOR

CROSS-REFERENCE TO RELATED PATENT

Not Applicable

FEDERALLY SPONSORED RESEARCH

Not Applicable

SEQUENCE LISTING OF PROGRAM

Not Applicable

BACKGROUND

Field

This application relates vertical takeoff and landing amphibious aircraft, specifically to a new configuration with a twin fuselage and single rotating center wing, engine(s), and rotor or fan. Center wing split ailerons deflect rotor or fan thrust to counter torque.

BACKGROUND

Prior Art

VTOL aircraft have been the subject of many patents and prototypes. Various configurations have been studied in an attempt to balance the helicopter vs. airplane tradeoffs. To date no patents or combinations of patents have been granted showing twin fuselages with a single rotating center wing, rotor and engine whereby the center wing ailerons counter the rotor torque. The twin fuselages eliminate the need for separate floats when landing on the water and provide for a location for retractable landing gear as well. The fuselages are spaced apart slightly more than the width of the rotor to enable the rotation of the center wing, engine and rotor from vertical facing to forward facing. By rotating the rotor into the direction of travel many of the complexities of a helicopter rotor assembly are eliminated and provide the aircraft with a faster forward speed. By locating the engine and rotor in the center of gravity only a single rotor or fan is required. When the engine and rotor are in the forward flight position the center of weight is moved forward providing for a forward stall dynamic as found in most aircraft. The aircraft presented would eliminate the requirement of a long runway making it ideal for commuter operations. Should an engine fail the aircraft can land as a glider with the center wing in the slightly rotated position.

Pub. No. US 2009/0045295 A1—Lundgren, does not show a center wing and has to use contra-rotating rotors to subdue rotor torque. Additionally the fuselage must be routed under the rotors; such geometry is not suitable to land on the water.

Pg. Pub #2006/0016931—Malvestuto, does not show a single center wing and rotor or fan where the ailerons counter the rotor torque and as a result this configuration two wing mounted rotors are required increasing the probability of failure and cost.

U.S. Pat. No. 7,802,754 B2—Karem, also does not make use of a single center rotor and part of the wine remains in the downwash of the rotor.

U.S. Pat. No. 7,143,973 B2—Ballew, uses contra-rotating rotors and not a rotating wing and ailerons in the down wash of the rotor to counter rotor torque as does the present invention.

U.S. Pat. No. 6,974,105 B2—Pham, shows a tilting engine and rotor with tail rotor.

U.S. Pat. No. 6,592,073 B1—Meekins, teaches a twin fuselage with no VTOL ability.

U.S. Pat. No. 6,367,736 B1—Pancotti, shows rotating outboard wings and rotors for control and to minimize the rotor wash from hitting the wing. This configuration still requires the use of two engines.

U.S. Pat. No. 5,758,844—Cummings, uses twin fuselages as does the present invention but no rotating center wing and ailerons.

U.S. Pat. No. 5,395,673—Rutan et al. Shows an unmanned aircraft with a center fuselage. This configuration does not allow for passengers or cargo. The center wing does not provide for ailerons to counter rotor torque.

U.S. Pat. No. 5,340,057—Schmittle, must take off in the tail sitting position and cannot land without the aid of a resilient surface.

U.S. Pat. No. 5,071,088—Betts, Shows a twin fuselage where the center wing is fixed. The engines shown would be too close to the surface of the water to operate as an amphibian. It would be advantageous for the fan or rotor to rotate to direct all the force in the required direction.

U.S. Pat. No. 4,681,878—Vaughan et al., shows twin tilting rotors with the rotors connected in case one engine fails. This requires a transmission and drive shaft to connect with the non-working rotor and engine strong enough to power both rotors. Should a rotor fail the aircraft could no longer land vertically.

U.S. Pat. No. 3,244,246—Weiland, shows a twin hulled ground effect vehicle using turbofan engines forcing and trapping air under the wing. Rotors are not used and turbofan engines can thrust air without a torque component. Two rotors or fans are required to counter torque.

SUMMARY

In accordance with one embodiment an amphibious aircraft comprising two fuselages spaced apart to enable the placement of single center wing and ailerons, engine and rotor such that they may be rotated from vertical flight to horizontal flight and back while center wing split ailerons counter rotor torque. Standard aircraft components are employed such as a vertical tails and horizontal stabilizers.

DRAWINGS

In the drawings.

DRAWINGS

Reference Numerals

Figure 1:
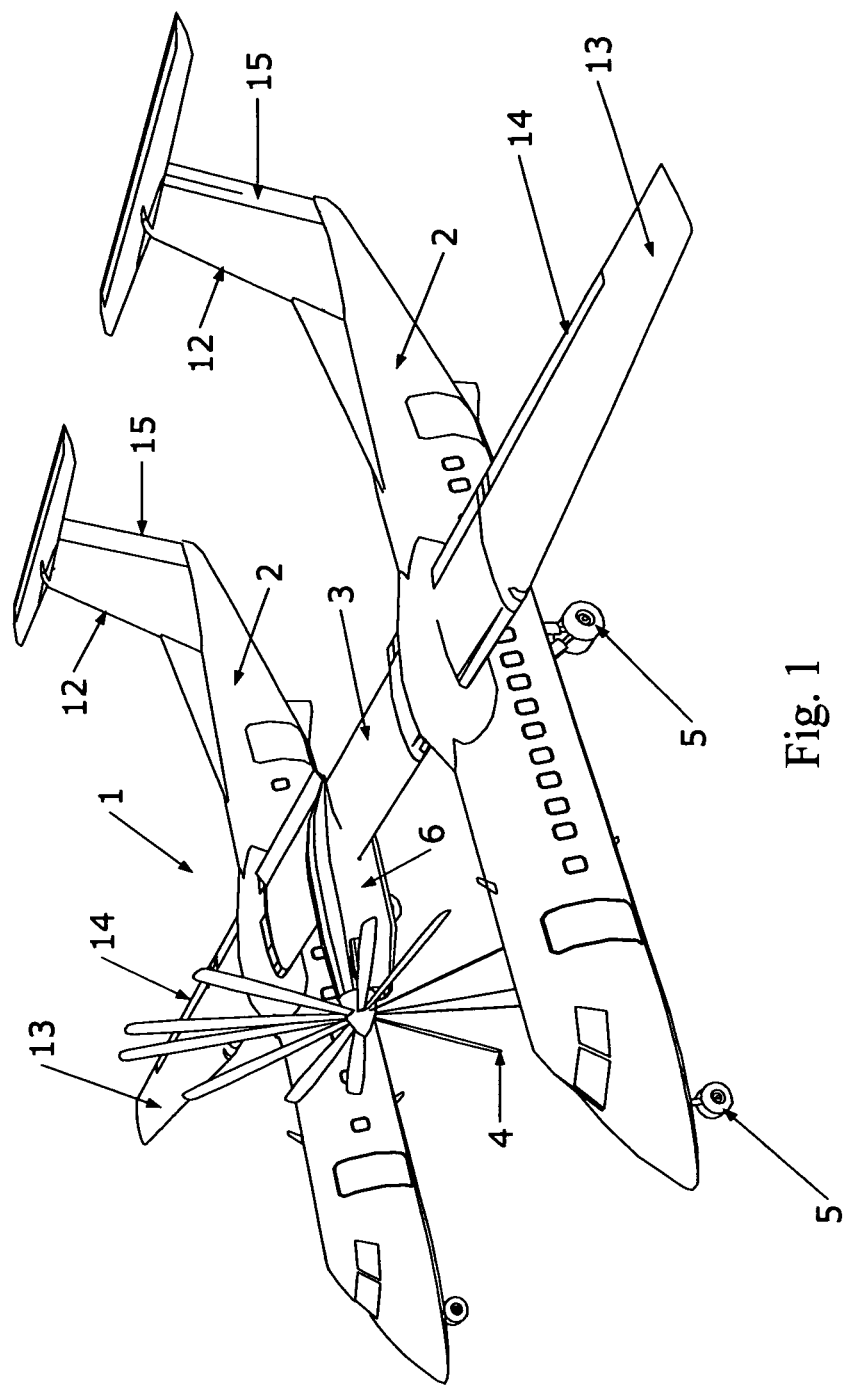
FIG. 1 shows the aircraft center wing in the forward flight position.

1. VTOL Aircraft
2. Fuselage

3. Center Wing in the forward flight position
4. Rotor
5. Retractable Landing Gear
6. Engine
7. Ailerons in counter torque position
8. Water rudder in the down position
9. Center Wing in the taxi/STOL position
10. Center Wing in the VTOL position
11. Elevator
12. Vertical stabilizer
13. Outboard fixed wing
14. Aileron
15. Rudder
16. Flaps

DETAILED DESCRIPTION OF THE PREFERRED EMBODIMENTS

Figure 2:
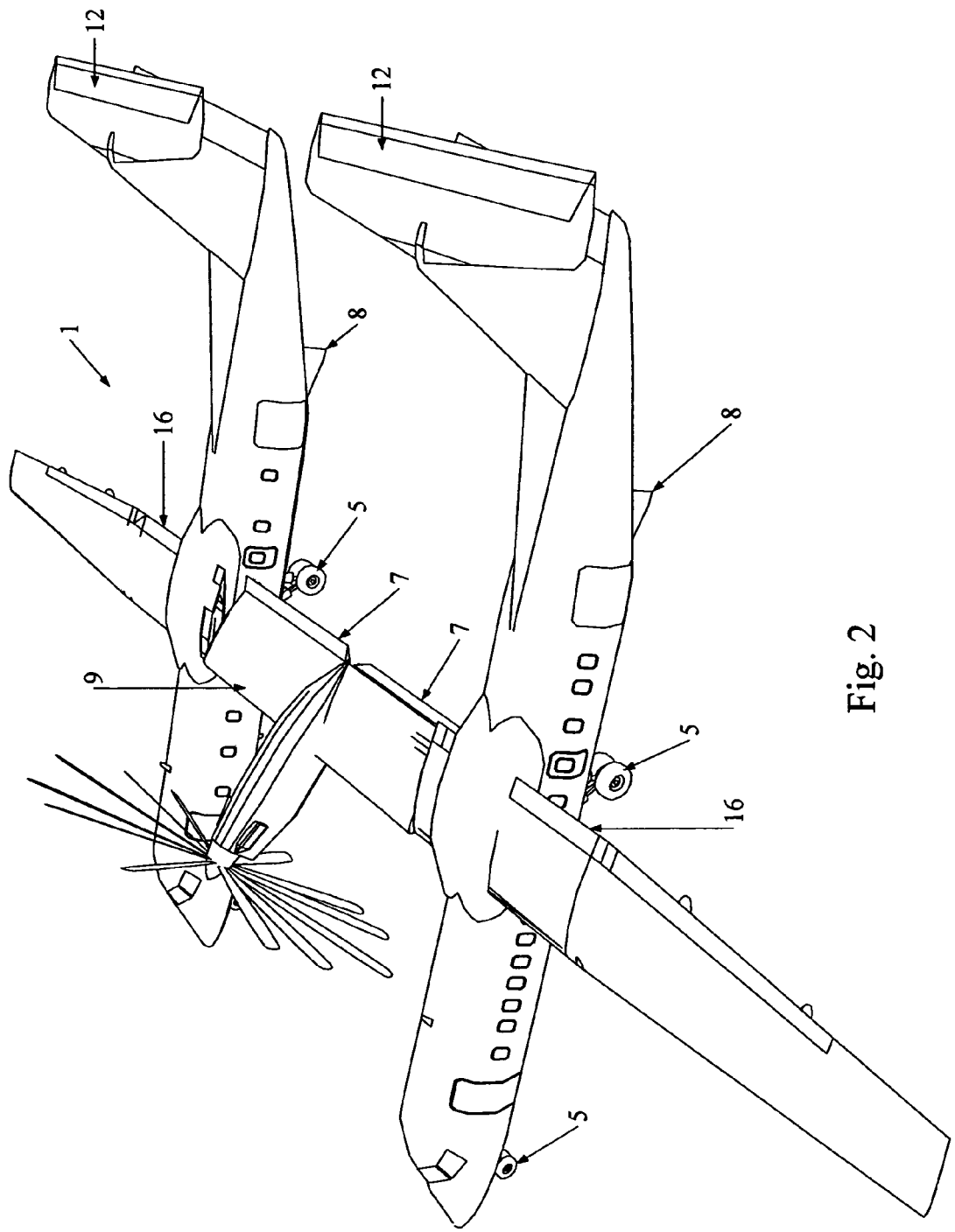
FIG. 2 shows the center wing in the taxi and STOL (Short Take Off and Landing) position.
Figure 3:
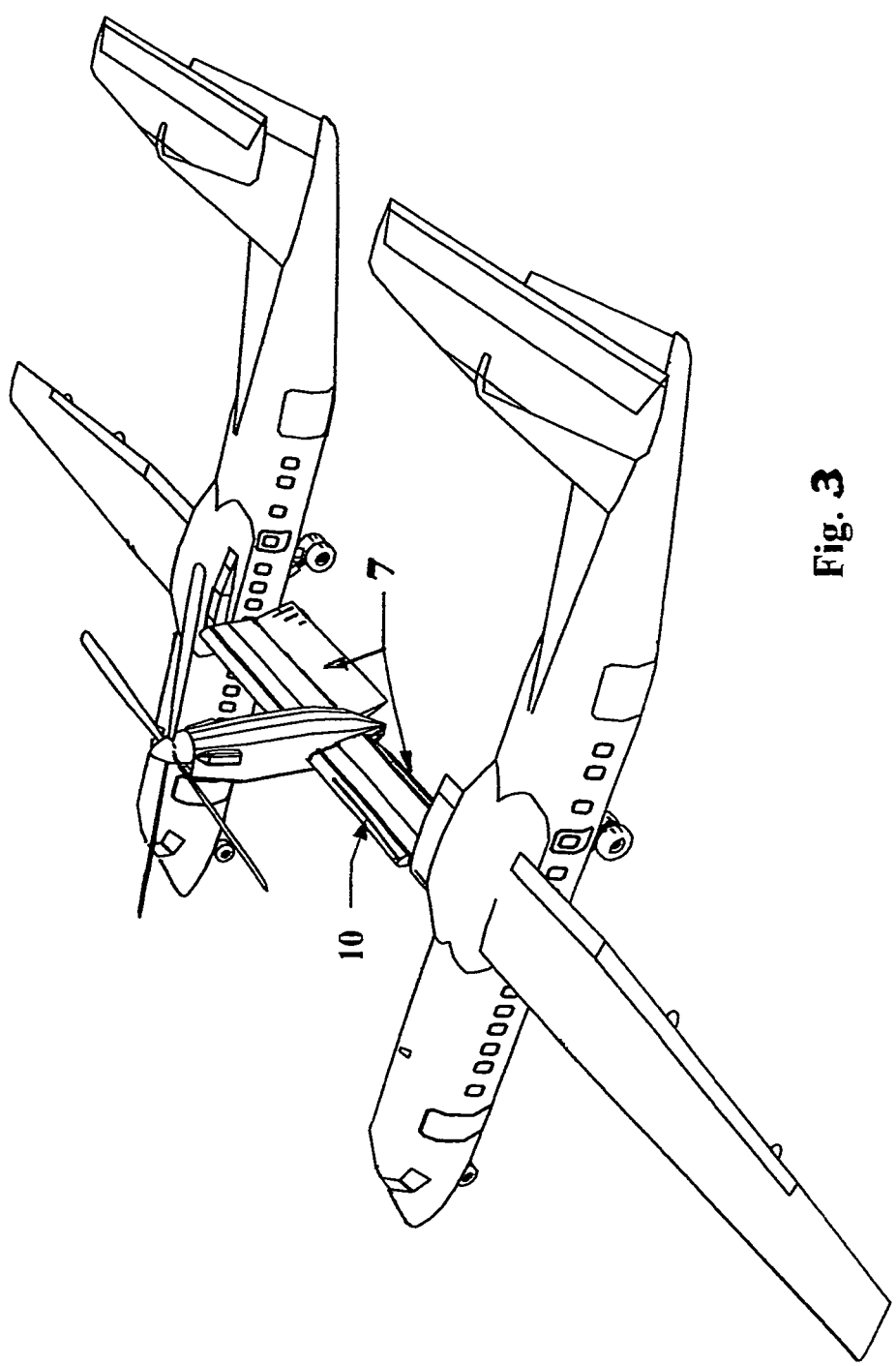
FIG. 3 shows the center wing in the VTOL (Vertical Take Off and Landing) position.

One embodiment of the concept presented is shown in FIGS. 1, 2 and 3.

FIG. 1 shows a passenger and or cargo carrying amphibious aircraft (1) in the high speed forward flight mode. The twin fuselages (2) are shown spaced horizontally apart to permit the center wing (3), engine (6) and rotor (4) to rotate freely from approximately vertical to horizontal and back between the passenger or cargo carrying fuselages (1). The configuration provides for the location of the landing gear (5) to retract directly into the fuselage (2). Two vertical stabilizers (12) are shown attached to the aft portion of the fuselages. Two outboard fixed wings (13) extend outward from the fuselages. Ailerons (14) are provided on said fixed wings for forward flight control. Each vertical stabilizer is provided with a rudder (15).

FIG. 2 shows an amphibious aircraft (1) in the taxi or STOL mode. The ailerons (7) are shown in the deflected position to counter the rotor torque. For water operations the rudders (8) are shown in the extended position. The center wing (9) is shown slightly rotated. Elevators (11) are provided to adjust the angle of attack on the fixed wing. Flaps (16) are shown on the outboard fixed wings to provide added lift for an engine out landing.

FIG. 3 shows an amphibious aircraft (1) in the vertical takeoff and landing position whereby the center wing (10) is rotated to vertical or near vertical position providing for a vertical takeoff or landing.

I claim:

1. An aircraft (1) comprising:
   two fuselages (2) spaced apart from one another, each of which having a stabilizer (12) extending from an aft portion;
   a center wing (3) being the only structure connecting the two fuselages;
   wherein said center wing has a rotor (4) and at least one engine (6) attached to is such that said center wing, rotor, and at least one engine are placed near a longitudinal center of gravity of the aircraft;
   wherein said center wing contains split ailerons (7) that counter rotor torque by deflecting in opposite directions a down-wash created by said rotor;
   wherein said center wing, rotor, and at least one engine can be rotated in unison with respect to said two fuselages from a vertical flight position to a horizontal flight position and back while said ailerons counter the rotor torque; and
   an outboard fixed wing attached to an outboard portion of each fuselage.

2. The aircraft of claim 1, wherein said fuselages can be used as a flotation device allowing the aircraft to land on water.

3. The aircraft of claim 2, wherein said fuselages each have a water rudder.

* * * * *